March 1, 1927.
R. W. DAVENPORT
PROCESS OF TRANSFORMING HEAT
Filed March 12, 1925
1,619,196
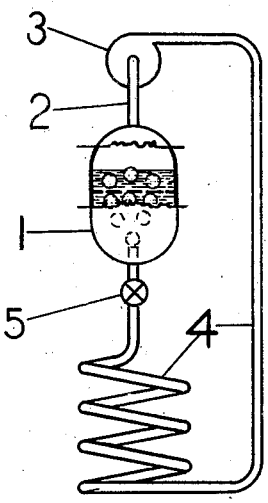
INVENTOR
Ransom W. Davenport.

Patented Mar. 1, 1927.

1,619,196

UNITED STATES PATENT OFFICE.

RANSOM W. DAVENPORT, OF DETROIT, MICHIGAN, ASSIGNOR TO CHICAGO PNEUMATIC TOOL COMPANY, OF NEW YORK, N. Y., A CORPORATION OF NEW JERSEY.

PROCESS OF TRANSFORMING HEAT.

Application filed March 12, 1925. Serial No. 15,172.

This invention is an improved process of transforming heat, or mechanical process of the class known as thermodynamic cycles, and one of its principal objects is to provide an improved art of refrigeration adapted to employ working substances of the type disclosed and claimed in my co-pending application Ser. No. 603,998, filed Nov. 22, 1922.

The subject matter of the present application is directed to the inventions originally disclosed in my application No. 570,015 filed June 22, 1922, and enlarges upon the subject matter of said original application.

One object of my invention is to provide a novel method of using liquids of comparatively high boiling point to produce refrigeration at comparatively low temperatures, thereby much improving the art in both safety and convenience, over the old methods which require the use of compressed gases or vapors which are both difficult and dangerous to use.

It is a further aim of my invention to combine certain advantages of the old cold-air refrigeration process with those of the old vapor compression process and at the same time, eliminate several of the disadvantages of both, by providing a new art of refrigeration which involves not only vaporization, compression and liquefaction, as in the vapor cycle, but also expansion, as in the cold-air cycle.

My invention also consists in a novel thermodynamic cycle which may be performed with a closer approach to theoretical reversibility than either the reversed Clausius or Joule cycles commonly known and used heretofore, for refrigeration.

Reference will hereinafter be made to a form or forms of apparatus for carrying out my improved process and to working substances upon which my process may be performed; but it is to be understood that I am neither disclosing nor claiming such machines or refrigerants in this present application. Suitable machines and devices are disclosed and claimed in my co-pending application in heat engines Ser. No. 708,936 filed Apr. 25, 1924. Suitable compositions of matter are set forth and claimed in the application in working substances above identified, and the three other applications herein cited cover, with this present application, a closely related series of inventions.

The accompanying drawing represents, diagrammatically, one form of apparatus in which may be performed, in ways chosen merely for illustration, the four essential steps of my invention. It is to be definitely understood that the carrying out of my improved process of transforming heat is not in any way confined to or limited by the employment of the herein described or any other form of device or arrangement of devices; nor to the herein described ways and methods of using such apparatus except in so far as is defined and specified in the appended claims.

Thermodynamic processes, to which general class of mechanical processes the present invention belongs, all involve one or more of the operations known as compression, condensation or liquefaction, vaporization or boiling, and expansion; and in all cases these operations are performed in and by certain devices such as pumps, chambers, engines, nozzles, etc., upon fluids known as working substances.

Which among these operations may be involved in any particular cycle or process obviously depends principally upon the thermodynamic properties of the working substance therein employed. For example, in the old and well known reversed Joule cycle or cold-air refrigerating process, the working substance is air, and it follows that this cycle involves but two of the above operations, namely, compression and expansion, since air is neither liquefied nor vaporized, but remains gaseous, and the sensible heat only is transformed into kinetic energy by kinetically expanding it to produce the refrigeration. The cold-air process therefore has the disadvantage that, in order to produce refrigeration at moderately low temperatures, from 0 to 30 deg. F., for example, the volume of air handled must be very great or else the pressures must be higher than necessary producing lower temperatures than required, involving considerable thermal and mechanical losses.

On the contrary, in the old and well known reversed Clausius-Rankine cycle, or vapor compression refrigerating process, the working substance is not a gas but a liquid of low boiling temperature such as ammonia or sulphur dioxide whose vapor is removed at a single constant lower temperature and pressure, and which vapor is then compressed to and liquefied at a constant higher temperature and pressure. It follows that this process involves but the three steps of compression, liquefaction and vaporization since the liquid is fed back, warm, from the higher to the lower pressure operation without any expansion whatever. One source of inefficiency in this process is that the warm liquid is fed back without volume change, for a liquid cannot expand like a vapor or a gas, and hence this step is in theory and in practice, totally irreversible. But perhaps the most serious disadvantages of this process are due to certain inherent properties of liquid itself. Since all common and convenient liquids like water or alcohol have but very low vapor pressures—a fraction of an inch of mercury, perhaps—at refrigerating temperatures, they have never been used on a practical scale since no practical method of removing their vapor at these extremely low pressures has ever, to my knowledge, been suggested. As a consequence, liquids with practical vapor pressures at refrigerating temperatures, like ammonia, sulphur dioxide etc., have to be used notwithstanding the disadvantageously high pressures of the vapors at ordinary temperatures. Another inherent property of liquids, their tendency to superheat during evaporation, renders the old vapor compression process very inefficient, especially with certain liquids.

The boiling point of a liquid is the temperature at which its vapor pressure is equal to the total pressure to which the liquid is subjected, usually the atmospheric pressure, and a liquid begins to boil, i. e., emit bubbles of vapor, when its temperature is raised to a point at which its vapor pressure is equal to the total pressure on its surface. The bubbles of vapor are always evolved at certain definite points where small gas bubbles (either evolved from the liquid, or due to air adhering to the vessel) are present. As the boiling proceeds, these points diminish in number owing to the expulsion of gas, and after a time disappear altogether. The temperature then rises several degrees above the boiling point without the formation of bubbles. At last, however, an explosive rush of vapor is evolved, usually in one large bubble from the bottom of the vessel, the temperature sinking again to the boiling point, and the process is repeated. According to Aitken (1874) normal boiling occurs only if bubbles or cavities, and hence the vapor of the liquid, are present. This result is quite general; the phase transformation proceeds normally only if both phases are present. If only one phase is present, the transformation into the other lags behind the change of temperature or pressure, and then occurs violently and spasmodically.

In the conventional refrigerating process, normal boiling is almost entirely prevented owing to the elimination of all non-condensible gas from the system, which elimination is made as complete as possible, under the long-established impression that such gases can not be made to produce any but harmful effects.

I find that the old process is particularly inadequate to secure normal boiling of liquids of higher boiling point, and the result is that the apparent volumetric efficiency of the pump or compressor is made impracticably low. Even with liquids of the type commonly used, the conventional refrigerating process secures only spasmodic boiling, and the density of the vapor taken into the compressor is often far below that corresponding with the actual temperature of the refrigerator. Furthermore, since it is impossible to unequally heat a vessel containing liquid and vapor only, when, as is usually the case, several refrigerating temperatures are desired, all the heat has to be absorbed at the lowest temperature and vapor density with consequent inefficiency, or a separate system operating at a different back pressure has to be provided.

My improved thermodynamic cycle differs essentially and basically from the processes above described.

My improved art of refrigeration may be said to consist in conducting a suitable working substance through a closed cycle involving, successively, the vaporization, compression, liquefaction, and expansion of the working substance. While I propose to set forth these four steps of my process separately, for the sake of greater clearness, it is to be understood that the steps need not be practised separately, and in fact may actually overlap in practice.

Referring, now, to the drawing, 1 represents a vaporizing chamber or boiler, containing liquid as shown, which is commonly placed in the refrigerator, and connected by pipe 2 to a compressing device 3 while 4 is a condensing member and 5 an expansion device, all of which when connected by pipes as shown, combine to form a closed circuit for the working substance. The space not occupied by liquid is to be understood as being filled with the vapor of the liquid and a suitable non-condensible gas.

The carrying out of my invention may be illustrated as follows: Upon starting the compressing device 3 which may be driven by any suitable means, the four steps of my improved process are performed continuously as the working substance is caused to traverse the system, and heat is absorbed in the member 1 and ejected from the member 4 at a higher temperature, by the boiling of the liquid in the former and the condensing of vapor in the latter member. The mixture of vapor and gas removed from member 1 is compressed to a higher total pressure by the member 3, and the vapor-gas mixture leaving the member 4 is expanded in thermal contact with the condensate formed therein, from the higher to the lower total pressure, by the expansion device 5, whence they are discharged back into boiler 1.

Assuming, for illustration, that the condenser ejects heat at a final temperature of 25 deg. C., and that it is desired to produce refrigeration at an initial temperature of −5 deg. C., and final temperature of 5 deg. C., with, for example, carbon tetrachloride, the vapor tension of which is only about 1 inch mercury at −5 deg. C. and about 5 inches at 25 deg. C.; and that the partial pressure of the non-condensible gas-air, for example, in the condenser is about 25 inches so that the total pressure therein is about that of the atmosphere, the separate steps of my process will now be set forth in detail, beginning with the expansion step.

The expansion device 5, which may be of any form, preferably of the kinetic type and assumed for illustration to be a turbine nozzle, is so arranged that, taking in the vapor-gas mixture from the member 4 at one atmosphere total pressure, it expands it down to about 6 inches of mercury or 24 inches vacuum, meanwhile absorbing heat from the liquid from the condenser which is brought into thermal contact with it, and transforming this heat into kinetic energy which is available to do work. The streams of liquid and gas mixture are then discharged into the member 1 at the assumed total pressure of 6 inches, and the partial vapor pressure being a fraction of this figure as it was at the outlet of condenser 4.

The next step, the vaporizing of the liquid, takes place in the boiler 1. The continual introduction of the gas mixture, with the liquid, prevents the superheating which ordinarily results from the constant removal of the vapor as in the conventional process, since new voids are constantly formed in the liquid by the non-condensible gas, so that the prescribed conditions for normal boiling are constantly maintained.

Owing to the peculiar principles of my invention, the point of greatest absorption of heat is at or closely adjacent the nozzle or expansion device 5. The absorption of heat continues in lesser degree as the vapor gas mixture expands up through the liquid refrigerant in boiler 1 but at progressively higher temperatures due to the tendency of the warmer liquid to rise and remain near the surface. This tendency toward progressively higher temperatures of the liquid in a boiler of the type shown is at least in part nullified by the continuous agitation of the liquid by the expansion of vapor and gas thereinto from expansion device 5 tending to produce circulation of the liquid and an equalization of temperatures. The total pressure is, of course maintained approximately constant throughout the boiler by the compressing device 3; but when the liquid in the upper part of the member is warmed to, for example, 5 degrees C., the vapor pressure may rise without affecting the total pressure, and also without effect upon the partial vapor pressure at the entrance, which remains the same fraction of the total pressure as before, i. e., 1/6 of 6 inches or 1 inch, corresponding with −5 deg. C. The more dense vapor corresponding with the higher temperature is then removed from the boiler by the pump 3 since it cannot go back to the colder portion and condense there. In effect, the vapor pressure is increased and the air is expanded to a lower partial pressure during this step, the total pressure of the mixture remaining substantially constant.

The next step is performed by the member 3 which takes in the air-vapor mixture through pipe 2 and compresses it into the member 4. Since the total pressure of the mixture taken in is far above the partial pressure of the vapor at even the higher refrigerating temperature, this step may be conveniently and efficiently performed in devices which would be utterly useless in the old vapor process. In the example given, it would be necessary to maintain a vacuum of 29 inches by the conventional process, which is commercially impossible. Moreover, even with a very efficient pump, the superheating of the liquid, which it is impossible to prevent in the old process, causes the vapor pressure actually effective in the pump to be very much lower than would be necessary if normal boiling could be maintained as in my improved process. Owing to the peculiar principles of my invention, therefore, instead of requiring a larger pump for a given amount of refrigeration, the same pump will actually produce more refrigeration with my process, simply because the air, while taking up no additional space in the pump, has both secured a normal vapor density and raised the total pressure.

The final step of my process consists in cooling the stream of vapor, air mixture, preferably progressively and gradually, in the member 4. The total pressure of the mixture discharged from the member 3 is assumed to be 1 atmosphere. During the compressing step its temperature has necessarily been raised to, for example, 35 deg. C., so that at the beginning of the condensing step the partial vapor pressure corresponds at a figure of about 7 inches of mercury; therefore the partial air pressure is 23 inches, and their sum is 1 atmosphere. As the stream of mixture passes through the member 4 it is cooled, preferably by thermal contact with a stream of water or air flowing in the contrary direction, so that the partial vapor pressure is caused to gradually fall, while the total pressure remains substantially constant at 1 atmosphere. At the completion of the step, the partial vapor pressure has fallen, along with the temperature, to about 5 inches while the air has been compressed from 23 inches to 25 inches, by virtue of the peculiar principles of my invention. Meanwhile the vapor has been liquefying and ejecting heat. The liquid, and the vapor-air mixture next re-enter the expansion device, and the cycle is complete.

It is obvious from what has been set forth, that the temperatures of refrigeration are, in my improved process of transforming heat, controlled by the total pressure in the condenser instead of by regulating the back pressure as in the vapor compression process, and therefore the temperatures of refrigeration may be lowered by raising the partial air pressure in the member 4 while keeping its temperature constant.

It will be seen that by the methods I provide, liquids of comparatively low vapor tension are made to produce practical refrigerating effects, and it will be clear that by preventing superheating of the evaporating liquid, by expanding part of the working substance, and by taking in heat at the highest possible temperature, my improved thermodynamic cycle may be carried out with a closer approach to theoretical reversibility than either the Clausius-Rankine or Joule cycles.

I claim:—

1. The process of transforming heat, involving repeatedly conducting a suitable working substance having a gaseous incondensible component, through a closed thermodynamic cycle, which consists in successively compressing, condensing, expanding, and vaporizing the said working substance.

2. The art of refrigeration consisting in compressing together a gas and a vapor; removing heat from said gas and vapor and condensing part of said vapor to liquid; expanding said gas and vapor in thermal contact with the said liquid; supplying heat to said liquid and vaporizing it in contact with said gas; and continuously repeating said steps in a closed cycle.

3. In the herein described art of refrigeration, the steps involving the raising of the partial gas pressure and the lowering of the partial vapor pressure, consisting in bringing into contact a body of liquid and a stream of gas-vapor mixture and removing heat from said liquid and said mixture; and maintaining the said liquid and said mixture under substantially constant total pressure.

4. In the herein described art of refrigeration, the step involving the lowering of the partial pressures of a vapor-gas mixture, consisting in expanding the said mixture from a higher total pressure to a lower total pressure.

5. In the herein described art of refrigeration, the steps involving the raising of the partial vapor pressure and the lowering of the partial air pressure consisting in bringing into contact a body of liquid and a stream of vapor-gas mixture and supplying heat to said liquid and said mixture; and maintaining the said liquid and said mixture under substantially constant total pressure.

6. In the herein described art of refrigeration involving the expanding of gas in contact with an evaporating liquid, the method of preventing superheating of the liquid consisting in releasing within the body of the said liquid a mixture of the aforesaid gas and the vapor of said liquid.

7. In the art of refrigeration involving the vaporizing of liquid to absorb heat, the method of vaporizing liquid consisting in expanding a mixture of the vapor of the said liquid with a suitable gas to a partial vapor pressure commensurate with a lower temperature, and establishing contact between said mixture and said liquid until the partial vapor pressure in said mixture rises to a point commensurate with a higher temperature, and then removing said mixture from contact with said liquid, meanwhile supplying heat to said liquid.

8. In the art of refrigeration involving the compressing of vapor from a lower temperature and pressure to a higher temperature and pressure, the method of controlling the said lower temperature consisting in compressing a gas with said vapor to a certain higher total pressure so fixed that the partial vapor pressure at the higher temperature bears to said higher total pressure, a ratio commensurate with the ratio of the partial vapor pressure at the desired lower temperature to the desired lower total pressure; and then maintaining said higher and lower total pressures.

9. In the art of refrigeration involving the mixing of liquid from a condenser also containing a non-condensible gas, with liquid already in the refrigerator, the method of cooling the first named liquid prior to said mixing, consisting in kinetically expanding the said non-condensible gas in thermal contact with said liquid from the condenser.

10. In a closed cycle system containing as a working substance a quantity of fluid which is liquid at ordinary temperatures and pressures and a gaseous fluid substantially inert to and insoluble in said liquid so that the total pressure on the liquid is in excess of its own vapor pressure, the thermodynamic process which comprises circulating the mixed gas and vapor of the liquid through the system, and forcing the mixed gas and vapor during each cycle of its movement to pass through a body of said liquid.

11. In a closed cycle system containing as a working substance a quantity of fluid which is liquid at ordinary temperatures and pressures and a gaseous fluid substantially inert to and insoluble in said liquid so that the total pressure on the liquid is in excess of its own vapor pressure, the thermodynamic process which comprises circulating the mixed gas and vapor of the liquid through the system, and expanding the mixed gas and vapor during each cycle of its movement in contact with a body of the liquid.

12. The process of producing refrigeration which comprises repeatedly conducting a suitable working substance through a thermodynamic cycle having a higher pressure part and a lower pressure part, and maintaining the pressure in the first named part substantially at one atmosphere absolute.

13. The process of producing refrigeration which comprises repeatedly conducting a suitable working substance through a thermodynamic cycle having a higher pressure part and a lower pressure part, and maintaining the pressure in the second named part below ten inches absolute of mercury and the pressure of said first named part at substantially one atmosphere absolute.

14. The process of producing refrigeration which comprises repeatedly conducting a suitable working substance through a thermodynamic cycle having a higher pressure part and a lower pressure part, and maintaining the difference in the pressures in said parts at less than one atmosphere.

15. The process of producing refrigeration which comprises repeatedly conducting a suitable working substance through a thermodynamic cycle having a higher pressure part and a lower pressure part, and maintaining the difference in the pressures in said parts at substantially twenty-six inches absolute of mercury.

16. In the process of producing refrigeration by the use of a working substance comprising a liquid and a gas substantially inert to and insoluble in said liquid, the step of expanding a stream of gas, liquid and the vapor of the liquid into a body of the liquid.

17. In a system of the type in which a working substance is repeatedly conducted through a thermodynamic cycle having a higher pressure part where heat is ejected and a lower pressure part where heat is absorbed, the process of refrigeration which comprises utilizing a suitable gas-vapor mixture as the working substance, and maintaining the sum of the partial gas and vapor pressures in the higher pressure part of the system at substantially one atmosphere absolute.

18. In a system of the type in which a working substance is repeatedly conducted through a thermodynamic cycle having a higher pressure part where heat is ejected and a lower pressure part where heat is absorbed, the process of refrigeration which comprises utilizing a suitable gas-vapor mixture as the working substance, and maintaining the sum of the partial gas and vapor pressures in the lower pressure part of the system at less than ten inches absolute of mercury.

19. In a system of the type in which a working substance is repeatedly conducted through a thermodynamic cycle having a higher pressure part where heat is ejected and a lower pressure part where heat is absorbed, the process of refrigeration which comprises utilizing a suitable gas-vapor mixture as the working substance, and maintaining the difference between the sums of the partial gas and vapor pressures in the higher and in the lower pressure parts of the system at substantially one atmosphere.

20. The process of refrigeration which comprises circulating a suitable working substance through a closed cycle having a higher pressure part where the working substance changes state and gives up heat and a lower pressure part where the working substances changes state and absorbs heat, and controlling the operating pressures of the high and low pressure parts of the cycle independently of the temperature required to produce change of state of the working substances in the higher pressure part of the cycle so as to produce a predetermined low temperature in the low pressure part of the cycle.

21. The process of refrigeration which comprises circulating a working substance having a gaseous incondensible component through a closed cycle having a higher pressure part where the working substance ejects heat and a lower pressure part where the working substance absorbs heat, and controlling the operating pressures of the higher and lower pressure parts of the cycle so as to produce a predetermined low temperature in the lower pressure part of the cycle regardless of the temperature of the higher pressure part of the cycle by fixing and maintaining the ratios of the partial pressures of the incondensible component to the total pressures of the parts of the cycle.

RANSOM W. DAVENPORT.